Figure 1:
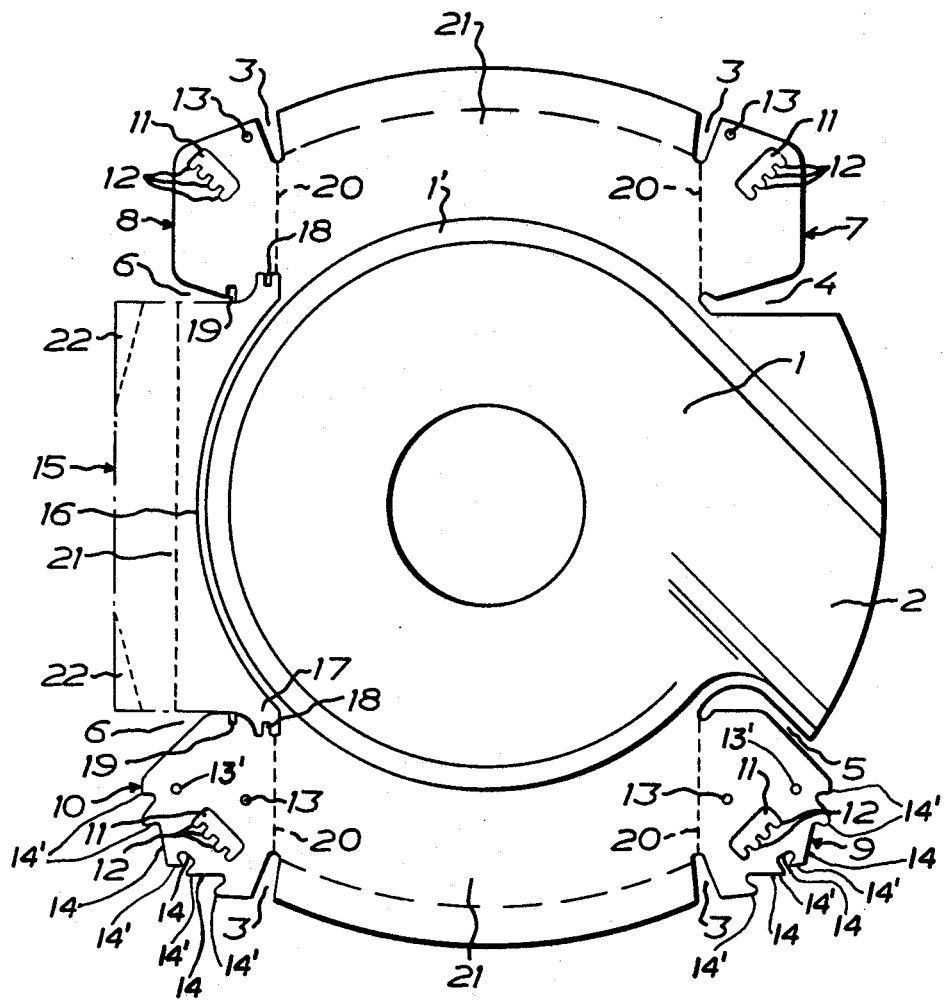

United States Patent [19]

Oscarsson

[11] 4,083,168
[45] Apr. 11, 1978

[54] CASING FOR A LAWN MOWER WITH A HORIZONTALLY ROTATING KNIFE

[75] Inventor: Jerker Evert Oscarsson, Tranas, Sweden

[73] Assignee: Stiga AB, Sweden

[21] Appl. No.: 694,420

[22] Filed: Jun. 9, 1976

[30] Foreign Application Priority Data

Jun. 18, 1975 Sweden ............................... 7507002

[51] Int. Cl.$^2$ .......................................... A01D 67/00
[52] U.S. Cl. ..................................... 56/320.2; 56/255
[58] Field of Search ................. 56/320.1, 320.2, 255, 56/295, 175, 13.4

[56] References Cited

U.S. PATENT DOCUMENTS

| | | | |
|---|---|---|---|
| 2,857,727 | 10/1958 | Cole | 56/320.2 |
| 3,085,386 | 4/1963 | Slemmons | 56/13.4 |
| 3,150,479 | 9/1964 | Wolf | 56/13.4 |
| 3,192,692 | 7/1965 | Slemmons | 56/13.4 |

Primary Examiner—Russell R. Kinsey
Attorney, Agent, or Firm—Beveridge, De Grandi, Kline & Lunsford

[57] ABSTRACT

The invention relates to a new design of a body or casing for a motor lawn mower with a horizontally rotating knife. The body includes a central elevated portion defining the working space for the rotary knife, and fastenings for the wheels and the handle of the lawn mower, as well as protective devices against accidental contact with the rotary knife are arranged in the casing. The central elevated portion and the surrounding parts, as well as the fastenings for the lawn mower wheels, handle and protective devices, are made from a single piece of sheet metal by pressing, punching and bending operations.

5 Claims, 3 Drawing Figures

CASING FOR A LAWN MOWER WITH A HORIZONTALLY ROTATING KNIFE

This invention relates to a casing for a lawn mower with a horizontally rotating knife comprising an elevated portion defining the space for the rotary knife, means serving as supports for the wheels and the handle of the lawn mower, and portions serving as protective devices against accidental contact with the rotary knife.

The lawn mower casings as at present employed comprise a plurality of details which are assembled after bending and other shaping operations. As a rule the casings are equipped with separate details such as wheel adjusting devices, that is, means for adjusting the cutting height, and protective devices against accidental contact with the rotary knife.

The object of this invention is to provide a lawn mower casing which has a minimum number of parts and can be produced in as simple a manner as possible.

According to the invention, the lawn mower casing as a whole is formed from a single piece of sheet metal or like material having a central elevated portion, the means serving as wheel and handle fastenings being suitably shaped projections situated beyond said elevated portion and bent upwardly with regard to the material surrounding said elevated portion, and the casing being provided at the front and the back with portions projecting from said elevated portion essentially on a level with the lower edge of said elevated portion and having preferably upwardly bent edges.

Figure 2:
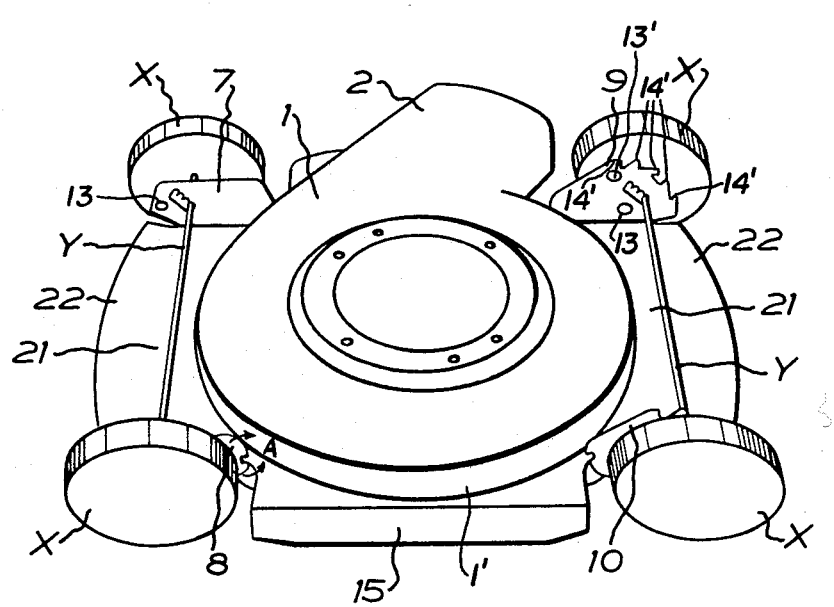
Figure 3:
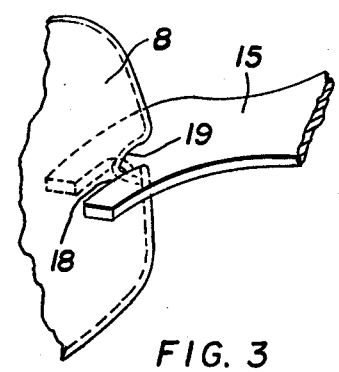

An embodiment of the casing according to the invention will now be more fully described with reference to the accompanying drawings in which:

FIG. 1 is a top plan view of a lawn mower casing before the final bending operation, FIG. 2 is a perspective view, as seen obliquely from above, of the same casing in the finished state, FIG. 3 is an enlarged, fragmentary view of portion A of FIG. 2.

The lawn mower casing consists of a single sheet metal piece having a central elevated portion 1, which in the finished lawn mower is intended to form the working space for a horizontally rotating cutting member (knife), and vertical wall portion 1; which in the finished lawn mower is generally vertical and so forms the lateral boundary of the working space. Separate guide or baffle plates which are required in conventionally designed lawn mower casings and mounted at the assembly of the mowers are thus dispensed with. An ejection chute is formed by a second elevated portion 2 which extends obliquely outwardly from the first elevated portion 1. The essentially planar sheet metal portions situated beyond the first elevated portion and to be described later are provides with indents 3, 4, 5 and 6 to provide projections 7, 8 and 9, 10, respectively. Each of the projections 7-10 is provided with a holes 13 and 13' and an elongated recess 11, one side of which is straight while the other side is formed with a number of U-shaped notches 12.

The two rear projections 9 and 10 are formed at their outer portions with notches 14 and hooks 14' which, together with holes 13', cooperate with and serve as abutments for the lawn mower handle.

A portion 15 situated between the projections 8 and 10 on one side of the sheet metal piece is meant to be separated from the remainder of the piece at the shaping thereof, the separation occurring along the inner edge 16 which closely joins the periphery of the central elevated portion 1. U-shaped notches 18 are provided at the protruding short ends 17 of the portion 15. Opposed U-shaped notches 19 are arranged at the facing edges of the projections 8 and 10. The relative distances between the bottoms of the notches 18 and 19, respectively, substantially correspond to each other, so that, upon assembly, notches 18 and 19 cooperate to retain portion 15 in the desired position, as depicted in FIG. 3.

As shown in FIG. 1, the projections 7-10 are bent upwardly on the lines 20, that is, so as to make substantially right angles with the plane of the casing.

Protruding planar portions 21 are disposed between the projections 7, 8 and 9, 10, respectively, and substantially lie on a level with the lower edge of the central elevated portion 1. The outer corner portions 22 of said planar portions 21 are bent in a slightly inclined direction along the broken lines. The portions 21 which serve as a protective device against accidental contact with the rotary knife also imply the advantage that the lawn mower will run extremely smoothly over the ground and will not be prevented by uneven patches in the turf in the same way as a lawn mower with a conventional casing defined by a substantially vertical edge which is apt to catch on uneven patches and obstacles. The protruding portions 21 with their edges 22 act as fending surfaces or runners and highly facilitate driving the lawn mower over ground depressions and elevations. The projections 7-10, as already mentioned, are intended to engage the shafts or axles Y of the wheels X of the lawn mower. Axles Y extend through the recesses 11 in said projections, the desired position of each respective axle being obtained by engagement of the axle in some of the notches 12. The axles are held in position in the respective notches by springs or like means which are interposed between the holes 13 and the axle and which hold axles Y in engagement with the selected notches. By a simple motion against the bias of the spring, the axles Y can be freed so that they can be shifted for alteration of the cutting height.

After the portion 15 has been detached from the sheet metal piece, the piece is bent at an angle along the broken line 21, and the corners 22 thereof are bent inwardly.

The portion 15 which constitutes a further protective device against accidental contact with the rotary knife is placed in position between the projections 8 and 10 in that the notches 18 of said portion 15 are entered into the notches 19 made in the projections 8 and 10 and now situated transversely of the notches 18, whereby the portion 15 will be pivotally retained to the casing and will closely join the ground independently of the set cutting height. The movement amplitude of the portion 15 is determined by the ratio of the sheet metal thickness to the width of the U-shaped notches 18 and 19.

The lawn mower casing according to the invention is particularly well suited for lawn mowers having a grass ejection chute. Since the central elevated portion 1 (which serves as a working space for the rotary knife and as a conveyance passage for the cut-off grass) and the second elevated portion 2 (which forms a grass ejection passage) will have a continuous smooth inner surface which highly facilitates the conveyance of the grass and eliminates the risk of grass collecting as is often the case in conventionally designed casings where joints between guide plates and other means are inevitable.

It is obvious, however, that the lawn mower casing according to the invention is also suitable for lawn mowers without any grass ejection chute. Here, too, the continuous smooth inner surface of the central elevated portion forming the working space for the knife is advantageous from the viewpoint of function as the collection of grass therein is altogether prevented. In lawn mowers without any grass ejection chute there are suitably provided, on both sides of the casing, protection devices corresponding to the portion 15 above.

While a preferred embodiment of the invention has been described above and illustrated in the drawings, it is readily understood that the invention can be modified in several ways within the spirit and scope of the appended claims.

What I claim and desire to secure by Letters Patent is:

1. In a casing for a lawn mower with a horizontally rotating knife comprising an elevated portion defining a space for rotation of the knife, a generally vertical portion extending downwardly from the elevated portion, and a lower portion extending generally horizontally from the generally vertical portion around the elevated portion, means connected to the lower portion serving as fastenings for axle-mounted wheels and for a handle of the lawn mower, and portions serving as protective devices against accidental contact with the rotary knife, the improvement in which the casing as a whole is formed from a single integral piece of sheet metal or like material, the means serving as wheel and handle fastenings are suitable shaped projections situated beyond the central elevated portion and bent upwardly with regard to the lower portion, and the lower portion is provided at the outward edge thereof with upwardly bent edges.

2. In a casing as claimed in claim 1, the further improvement in which each of the wheel fastening means is provided with an elongated opening, one edge of which has a number of substantially U-shaped notches adapted to form a series of abutments providing alternative settings for a wheel axle.

3. In a casing as claimed in claim 1, the further improvement in which the rear wheel fastening means are provided with notches and hook means adapted to cooperate with the handle of the lawn mower to retain the handle on the lawn mower.

4. In a casing as claimed in claim 1, the further improvement in which a protective screen device is provided for preventing accidental contact with the rotating knife and is formed by a piece of material detached from the single integral piece between the means serving as wheel and handle fastenings on one side of the central elevated portion, said device being movably connected to the single integral piece by U-shaped notches at the remote end edges of said device and oppositely directed U-shaped notches at adjoining edges of the single integral piece.

5. In a casing as claimed in claim 4, the further improvement in which the protective screen device is bent at an angle to provide an upper part thereof having an edge closely joining the central elevated portion of the casing, said upper part being substantially horizontal in position of use, the remainder of said device comprising a substantially vertical screening structure extending longitudinally between the front and rear wheels of the lawn mower adjacent one edge thereof.

* * * * *